United States Patent [19]

Martinez et al.

[11] Patent Number: 6,111,575

[45] Date of Patent: Aug. 29, 2000

[54] GRAPHICAL UNDO/REDO MANAGER AND METHOD

[75] Inventors: Anthony Edward Martinez, Austin, Tex.; Michael David Rahn, Rochester, Minn.

[73] Assignee: International Business Machines Corporation, Armonk, N.Y.

[21] Appl. No.: 09/160,060

[22] Filed: Sep. 24, 1998

[51] Int. Cl.[7] .................................................. G06F 13/00
[52] U.S. Cl. ........................... 345/352; 707/530; 707/540
[58] Field of Search ..................................... 707/530, 540, 707/101, 102; 345/339, 340, 352, 353; 709/102, 328; 712/240; 714/19

[56] References Cited

U.S. PATENT DOCUMENTS

| 5,434,965 | 7/1995 | Matheny et al. | 345/338 |
|---|---|---|---|
| 5,542,088 | 7/1996 | Jennings, Jr. et al. | 709/103 |
| 5,890,181 | 3/1999 | Selesky et al. | 707/530 |
| 5,907,410 | 5/1999 | Ohtake | 358/468 |
| 5,911,074 | 6/1999 | Leprince et al. | 395/703 |

OTHER PUBLICATIONS

WordPerfect 6.1 for Windows, Jan Weingarten, Undelete and Undo, p. 94–104, 1995.

*Primary Examiner*—Ba Huynh
*Attorney, Agent, or Firm*—Martin & Associates, L.L.C.; Derek P. Martin

[57] ABSTRACT

A graphical undo/redo manager provides a graphical indication of multiple tasks that were recently performed. A user may undo multiple tasks in one step by selecting a task the user wishes to revert to, and the graphical undo/redo manager then undoes all the commands that were done subsequent to the selected task, taking the computer program to a desired state in only one user operation. In similar fashion, a user may redo multiple tasks in one step by clicking on a selected subsequent task (that was previously undone) that the user wishes to go forward to, and the graphical undo/redo manager then redoes all the commands between the last undo and the selected task, including the selected task. In addition, the graphical undo/redo manager provides for collapsing multiple tasks into a marker, either automatically when certain commands are executed in the computer program or upon command by a user for future reference.

27 Claims, 6 Drawing Sheets

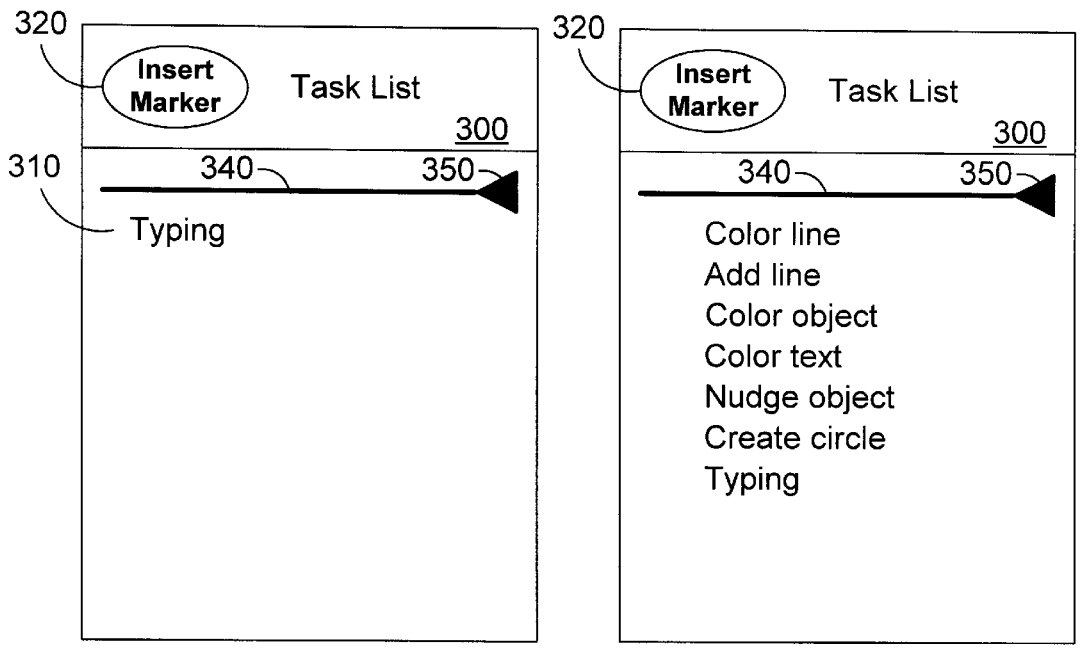
FIG. 3
FIG. 4
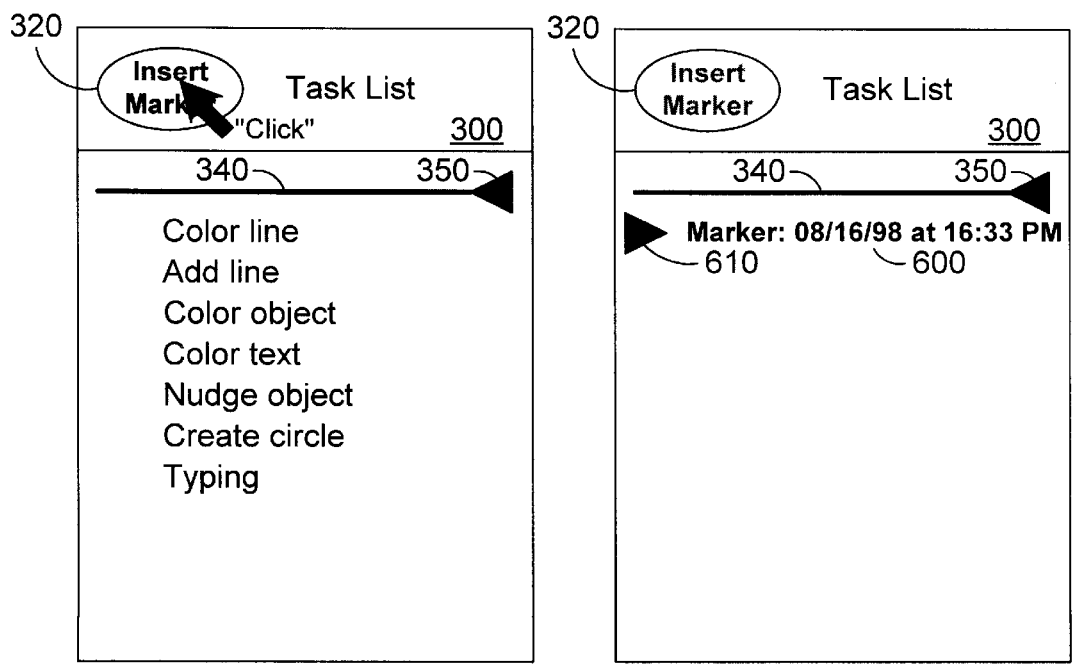
FIG. 5
FIG. 6

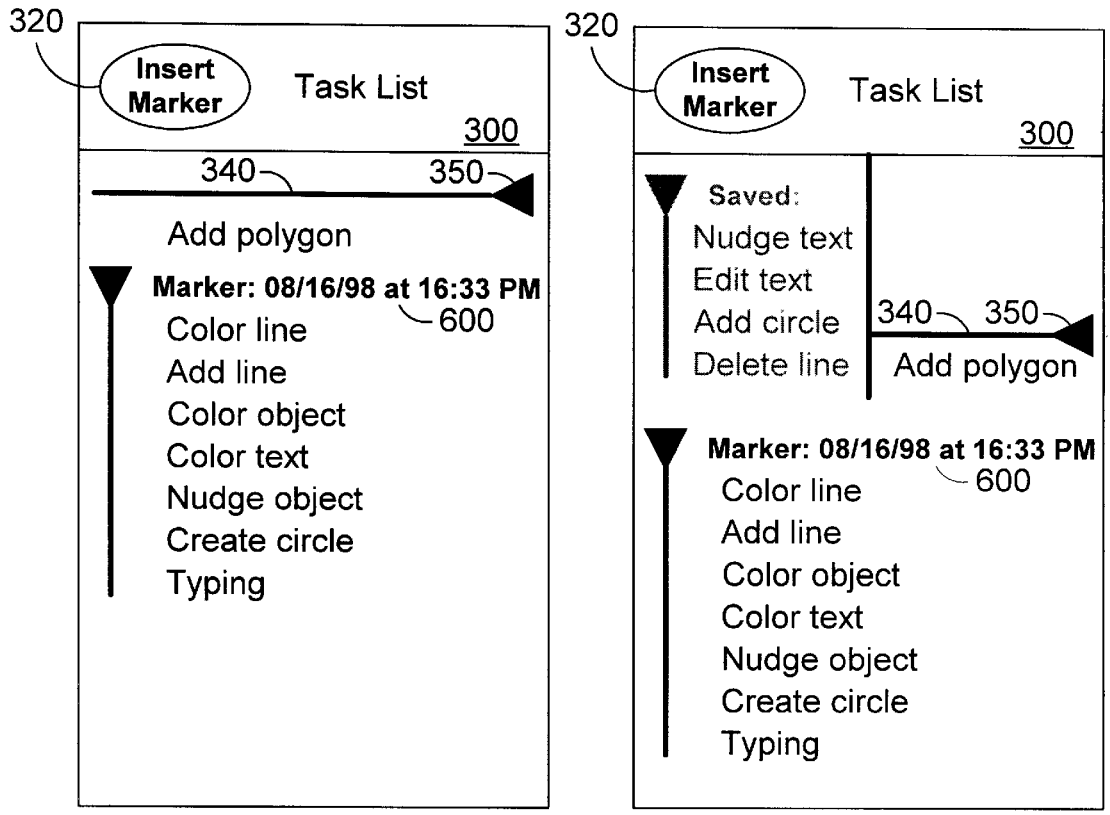
FIG. 13      FIG. 14
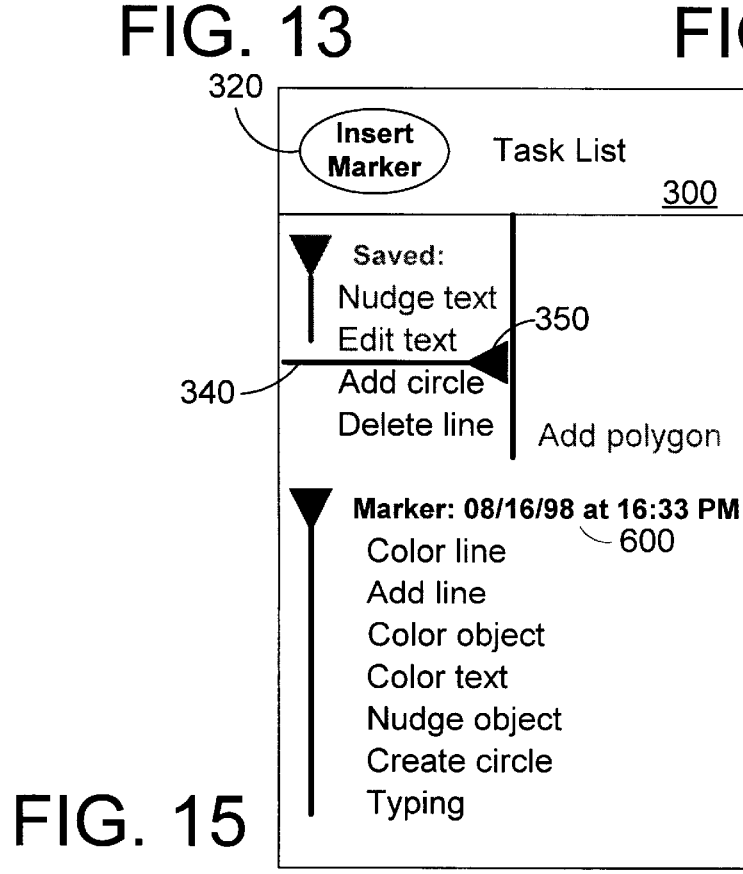
FIG. 15

GRAPHICAL UNDO/REDO MANAGER AND METHOD

BACKGROUND OF THE INVENTION

1. Technical Field

This invention generally relates to computer programs and more specifically relates to a mechanism and method for allowing a user to undo and redo more that one task in a computer program by using features provided on a graphical user interface.

2. Background Art

The development of the EDVAC computer system of 1948 is often cited as the beginning of the computer era. Since that time, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Early computer systems used command-based operating systems and software applications. These command-based systems provided a user interface that required the user to memorize a relatively large number of commands in order to perform meaningful work. The user interfaces for these command-driven computer programs required a relatively high level of skill to operate, and were not considered to be "user-friendly." With the introduction of the IBM personal computer (PC), computers became more widely available, both in the workplace and in homes, and the computer industry soon recognized the need to provide more user-friendly interfaces to computer programs. As a result, many different operating systems were introduced that provided a graphical user interface (GUI), including IBM's OS/2, Microsoft Windows, and the Apple McIntosh. Software applications with graphical user interfaces soon followed, and the vast majority of computer programs running on personal computers today provides a user-friendly graphical user interface.

Most graphical user interfaces provide many similar features. The basic display area in a graphical user interface is known as a window. A single window may fill the entire display, or the display can be split into a number of different windows. Most graphical user interfaces provide a menu bar that provides several drop-down lists of commands the user can perform. Various toolbars may also be provided that are customized to performing certain tasks within the computer program. A pointing device such as a trackball or a mouse is generally used to select various commands and options by clicking on the appropriate buttons on the menu bar, tool bar, or by selecting particular portions of a window.

Many computer programs have tasks or commands that may be performed by either clicking on the appropriate button on a menu or toolbar, or by using certain keystrokes on the computer keyboard. One good reason to provide the dual functionality of menu commands and keystrokes is to maintain compatibility between previous command-driven computer programs and their newer graphical versions. A user that is proficient in the keystroke commands can thus operate a new version of the software that has a graphical user interface by resorting to his tried and true techniques that worked in the command-driven software, and can thus be immediately productive while exploring the additional functionality provided by the graphical user interface as time allows.

Another good reason to provide keystroke equivalents for menu items and toolbar buttons is to provide shortcuts to frequently-executed commands. Many menu bars now have multiple sub-menus, and getting to a command that is nested two or three levels deep in menus with a pointing device can be time-consuming. It is sometimes faster to simply click on the equivalent keystrokes rather than navigating the graphical user interface.

One common feature that is provided in the graphical user interface of many computer programs is the capability to "undo" a task that was just performed. The "undo" command may be a command on a drop-down menu bar, a button on a tool bar, a page link, a dialog box, or may be performed using key-strokes similar to the command-driven interfaces of old. Of course, other mechanisms not disclosed herein are known in the art for undoing tasks at the request of a user. For the sake of convenience herein, the step of invoking an undo command in a computer program is referred to as undoing a task, recognizing that there exist various methods for invoking an undo command. Any and all suitable methods of invoking an undo command in a computer program fall within the scope of undoing a task as described herein. Similarly, the step of invoking a redo command in a computer program is referred to herein as redoing a task for the sake of illustrating the concepts of the present invention.

Some computer programs include the ability to undo several tasks one by one by repeatedly clicking on the undo button, which causes the application to undo each command one by one in reverse succession. Most graphical user interfaces that include an undo command also include a redo command that allows a user to redo the last command that was just undone. In this manner a user can click on the undo button repeatedly until she has backed up to a suitable point, and can then click on the redo button if she has backed up too far, or if she decides to redo the task just undone.

One problem with known undo/redo mechanisms is that the user must undo or redo one task at a time until a suitable stopping point is visually determined by the user observing the effect of undoing or redoing each task on the display. If a user realizes that she has performed thirty or so commands since a particular point in time, and she needs to undo those thirty or so commands, she must click the "undo" button thirty or more times in succession, watching as the previous thirty changes are undone one by one in reverse order. This can be excruciatingly slow if the computer program requires the screen to refresh to reflect the effect of each undo. Similarly, if the user undoes thirty commands and realizes that the last fifteen were needed, she must then click on the redo button fifteen times to get the computer program back to the desired state. Another problem with the current single-step undo/redo mechanisms known in the art is that some tasks that are performed are not easily visually detected on the user's screen. For example, if the user formats a wordprocessing document to include a particular header on each page, but the display mode does not show the page headers, it will not be visually apparent to the user what this task does by simply observing the display as the task is undone or redone. For these reasons, the process of single-stepping through undo and redo levels can become annoying for a user.

In many computer programs, the user can only undo one task, and can only redo the one task that was just undone.

Other computer programs allow multiple undo/redo, but only to a few levels deep, such as five levels of undo/redo. If a user needs to undo ten tasks in a computer program that only defines five levels of undo/redo, the user cannot return to the desired state. Also, there is no mechanism known in the art that allows a user to retrieve her work from a specific point in time without saving multiple versions of the same document. These constraints in the prior art restrict a user's ability to explore and perform trial-and-error in using a computer program. Without a mechanism that allows a user to perform multiple levels of undo and redo at a time, the computer industry will continue to suffer from graphical user interfaces that are inconvenient and frustrating to use.

DISCLOSURE OF INVENTION

A graphical undo/redo manager provides a graphical indication of multiple tasks that were recently performed. A user may undo multiple tasks in one step by selecting a task the user wishes to revert to, and the graphical undo/redo manager then undoes all the commands that were done subsequent to the selected task, taking the computer program to a desired state in only one user operation. In similar fashion, a user may redo multiple tasks in one step by clicking on a selected subsequent task (that was previously undone) that the user wishes to go forward to, and the graphical undo/redo manager then redoes all the commands between the last undo and the selected task, including the selected task. In addition, the graphical undo/redo manager provides for collapsing multiple tasks into a marker, either automatically when certain commands are executed in the computer program or upon command by a user for future reference.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 3 is a display of a task list in accordance with a preferred embodiment showing a single task;

FIG. 4 is a display of the task list of FIG. 3 that includes several tasks;

FIG. 5 is a display of the task list showing the selection of the "insert marker" button with a pointing device;

FIG. 6 is a display of the task list of FIG. 5 after collapsing the several tasks into a single marker;

FIG. 13 is a display of the task list of FIG. 12 after a task is performed after an undo command showing that the tasks subsequent to the previous undo are deleted once a subsequent task is performed;

FIG. 14 is a display of the task list of FIG. 12 after a task is performed after an undo command showing the maintenance of the previously undone tasks even after a subsequent task is performed; and FIG. 15 is a display of the task list of FIG. 14 after the currency bar is dragged to redo some of the tasks previously undone.

BEST MODE FOR CARRYING OUT THE INVENTION

According to a preferred embodiment of the present invention, a graphical undo/redo manager and method provide the capability of undoing or redoing multiple tasks without requiring that the user execute a separate undo or redo command for each task. In this manner a user can easily navigate forward or backward in the task list to place the computer program in a desired state with a minimum of effort.

Figure 1:
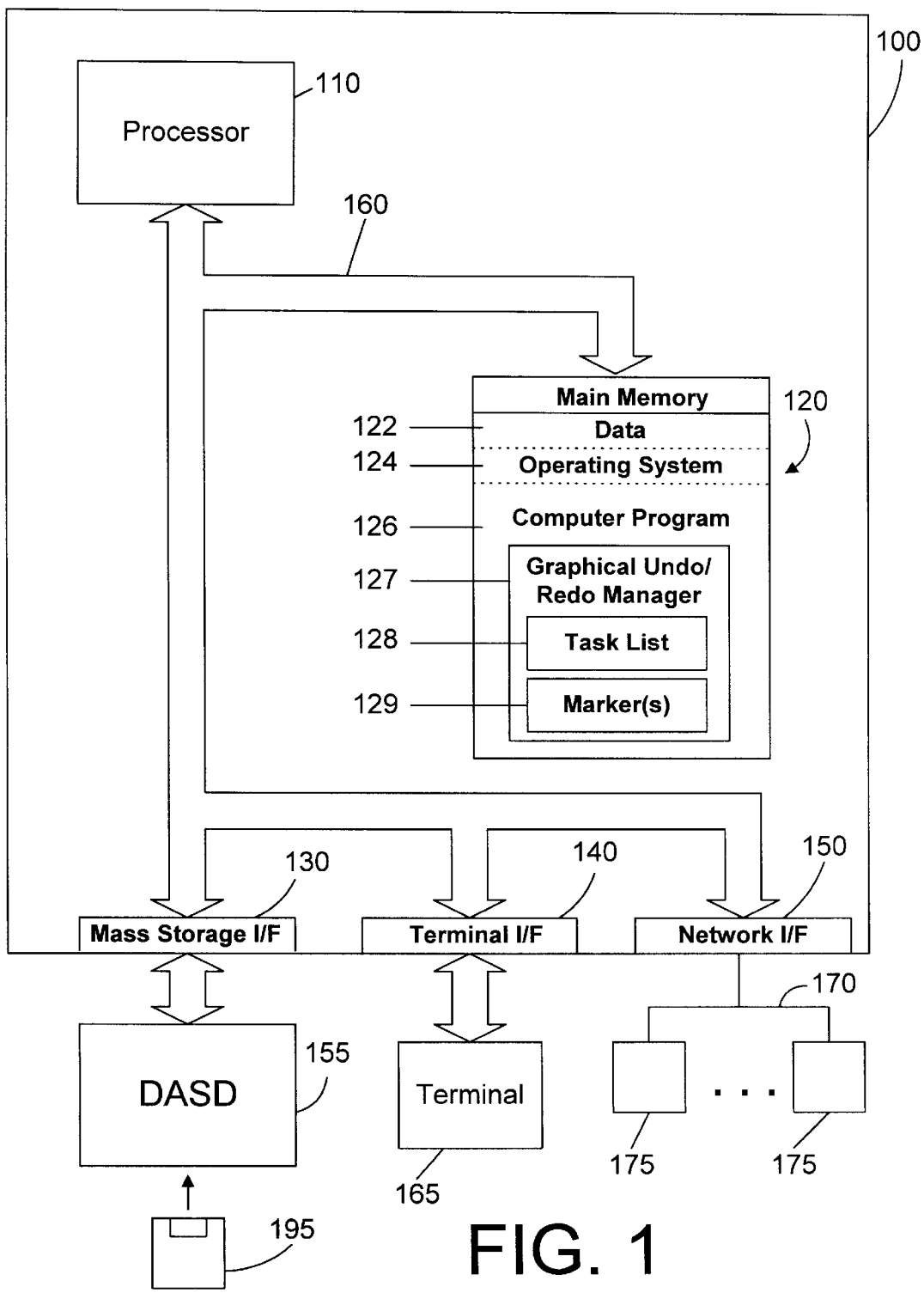
FIG. 1 is a block diagram of an apparatus in accordance with a preferred embodiment of the present invention.

Referring to FIG. 1, a computer system 100 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 contains data 122, an operating system 124, and a computer program 126 in accordance with the preferred embodiments. Computer program 126 includes a graphical undo/redo manager 127, which includes a task list 128 and one or more markers 129. Data 122 represents any data that serves as input to or output from any program in computer system 100. Operating system 124 is a multitasking operating system known in the industry as OS/400; however, those skilled in the art will appreciate that the spirit and scope of the present invention is not limited to any one operating system. Computer program 126 may be any suitable computer program, including system level computer programs such as operating systems, utilities, and system tools; software applications; an any other type of computer program that allows a user to perform a number of different tasks. The function of the graphical undo/redo manager 127 is described in more detail below.

Computer system 100 utilizes well known virtual addressing mechanisms that allow the programs of computer system 100 (such as computer program 126) to behave as if they only have access to a large, single storage entity instead of access to multiple, smaller storage entities such as main memory 120 and DASD device 155. Therefore, while data 122, operating system 124, and computer program 126 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 124. Operating system 124 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces (called input/output processors in AS/400 terminology) that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, one or more portions shown in main memory 120 may reside on another system and engage in cooperative processing with one or more programs that reside on computer system 100. This cooperative processing could be accomplished through use of one of the well known client-server mechanisms such as remote procedure call (RPC).

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 2:
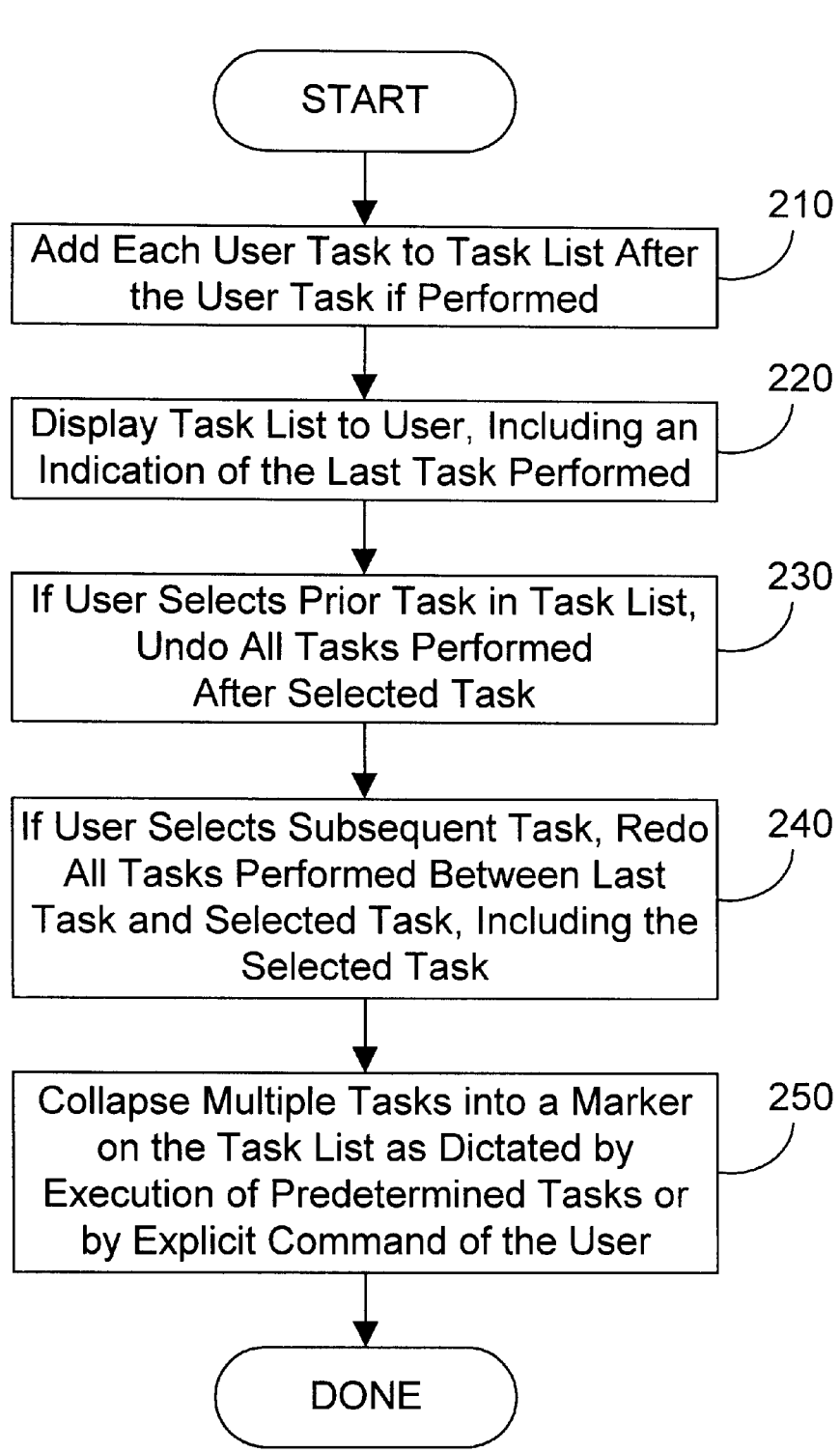
FIG. 2 is a flow diagram showing method steps in accordance with a preferred embodiment of the present invention.

Referring to FIG. 2, a method 200 in accordance with the preferred embodiments begins be defining a task list, and by adding each user task to the task list after the user task is performed (step 210). At some point in time, the user may be interested in undoing one or more of the tasks previously performed. At this point in time, the task list is displayed to the user (step 220). The displayed task list includes an indication of the last task that was performed. If the user selects a prior task in the task list, all tasks that were performed after the selected task are undone (step 230). If one or more tasks have already been undone, the user may select a subsequent task that may be redone. If the user selects a subsequent task that has been previously undone, all tasks between the last task and the selected task are redone, including the selected task (step 240). In addition, multiple tasks may be collapsed into a marker on the task list (step 250). The collapsing of tasks on the task list into a marker may occur in different ways. For example, the user may make an explicit command to collapse the tasks by identifying the tasks on the task list to be collapsed, or by executing an "insert marker" function (described in more detail below). In another example, the tasks on the task list are automatically collapsed into a marker upon the occurrence of specific commands in the computer program. For example, when a user selects a "save" command on the computer program, the computer program may cause all tasks that are defined since the last marker to be collapsed into a new save marker. Thus, the collapse of tasks into a marker can either be a manual process by the user, or may be an automated process that occurs incidental to the execution of some other command in the computer program.

The displays of FIGS. 3–14 will help to illustrate the function of the undo/redo manager in accordance with the preferred embodiments herein. These figures assume that a user is working in a graphics program, such as a computer aided drafting (CAD) program that allows the user to draw lines, shapes, and the like, to color drawing objects, and to add text as required. Referring to FIG. 3, a task list 300 is provided that displays one or more tasks 310 to a user. Task list 300 includes means for generating the task list 300 in time-order and means for displaying task list 300 to a user. The display for task list 300 includes an "insert marker" button 320 that a user may click on with a pointing device to cause a marker to be manually inserted into the task list 300, thereby collapsing all tasks since the last marker into the new marker. Note that tasks 310 are placed on the task list in time-order, with the new tasks being put at the top of the list and the older tasks being pushed farther down the list. Eventually the oldest items will scroll beyond the display limits of the task list 300. However, in the preferred embodiment, this information is still maintained and can be accessed by the user, if needed. One suitable way to maintain the undo/redo history is to provide scroll bars at one or two of the edges in the task list 300 to allow a user to scroll the viewing window of the task list 300 to different areas of the task list. Note that when task list 320 is empty when a user first starts up an application, the "insert marker" button will be disabled (as shown by the gray shading of the text) because there are no tasks to collapse into a marker.

The task list 300 includes a "currency line" 340 that is positioned above the last task that was executed. Only one task (i.e., typing) has been performed, so the typing task 310 appears immediately below the currency line 340, indicating that the typing task 310 was the last task performed. Currency line 340 preferably includes ahead portion 350 that allows the currency line to be easily manipulated with a pointing device by clicking and possibly dragging the currency line 340.

Figure 7:
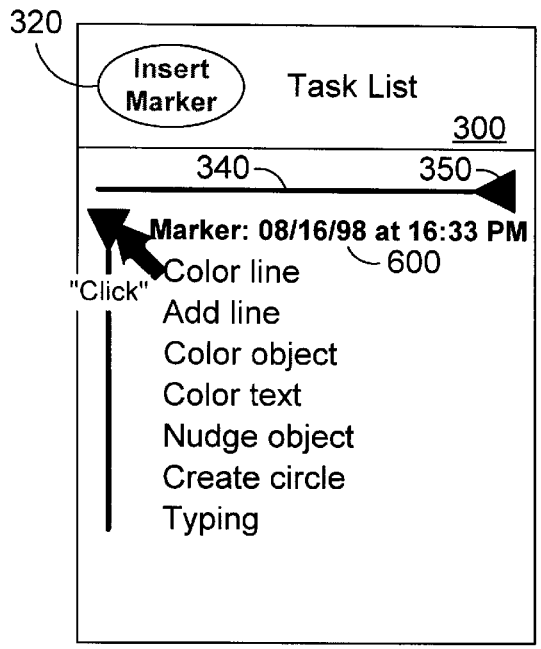
FIG. 7 is a display of the task list of FIG. 6 showing the expansion of the tasks collapsed into the marker.

FIG. 4 shows the task list 300 after the user has performed several additional tasks in the graphics program, namely, in this order: create circle; nudge object; color text; color object; add line; and color line. Referring to FIG. 5, a user may collapse the tasks on the task list into a marker by clicking their pointing device on the "insert marker" button. FIG. 6 shows the marker 600 that was created by the user clicking on the "insert marker" button in FIG. 5. Each marker suitably includes the time and date, and any other identifying indicia that help the user to visually identify and compare the marker to other markers. Marker 600 has an arrow head 610 (commonly known as a "twistie") associated with it to indicate whether the marker is currently displaying its collapsed tasks or not. The arrow head 610 pointing towards the marker 600 indicates that the tasks are collapsed within marker 600 and are therefore hidden from the user. However, a user may easily view the tasks collapsed within a marker by clicking on the arrow head 610 corresponding to the marker 600. The "insert marker" button 320 is disabled (as shown by the gray shading of the text) because there are no tasks to collapse into a marker. Referring to FIG. 7, when a user clicks on the arrow head 610, the arrow head changes to point down to indicate to the user that the tasks below the marker are the tasks that were collapsed within the marker.

Figure 8:
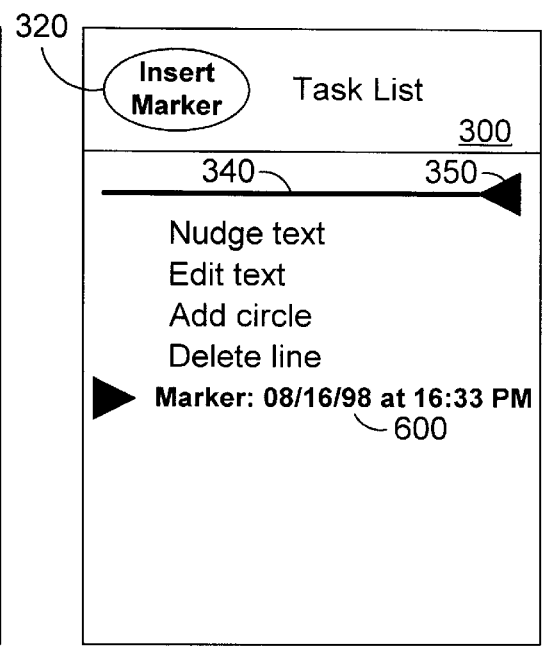
FIG. 8 is a display of the task list showing several subsequent tasks after the marker was inserted in FIG. 6.

FIG. 8 shows the task list of FIG. 7 after several more tasks have been performed, namely: delete line, add circle, edit text, and nudge text, in that order. At this point we assume that the user executes a save command in the computer program, and we further assume that the computer program and task list have been configured to create a save marker in the task list automatically each time the save command is executed, collapsing the tasks that have been performed since the last marker, as shown in FIG. 9.

Figure 9:
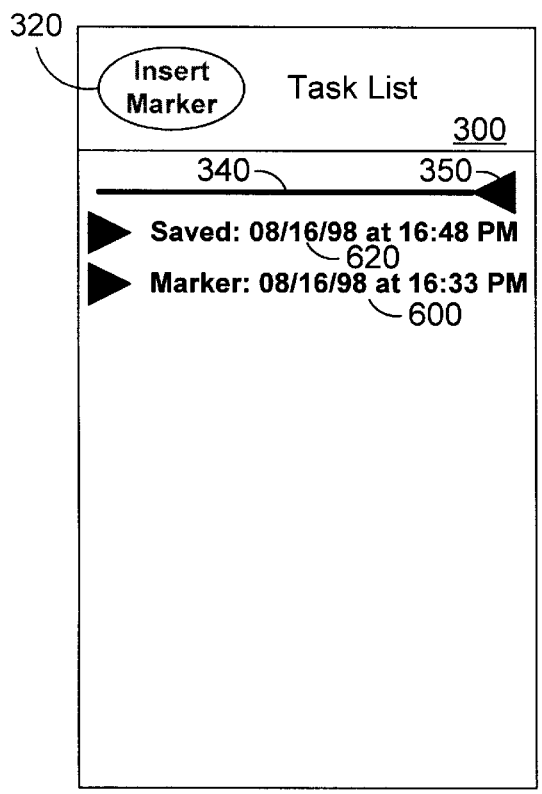
FIG. 9 is a display of the task list of FIG. 8 after collapsing several tasks into a save marker.
Figure 10:
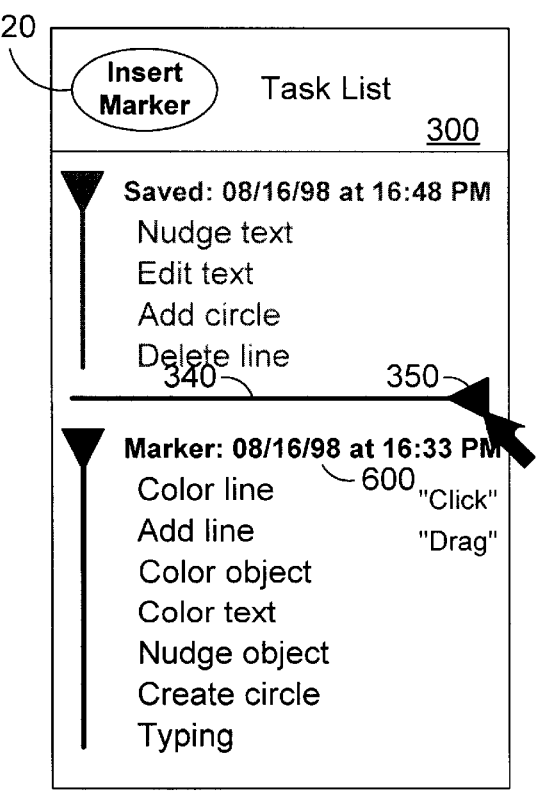
FIG. 10 is a display of the task list of FIG. 9 with the markers expanded to show their collapsed tasks and with the currency line being dragged to a new position in the task list by a pointing device.

FIG. 10 shows the task list of FIG. 9 with the markers expanded to show their tasks. With these tasks defined on the task list, we can now describe how a user may easily undo multiple tasks with a single action. One way to undo multiple steps is for the user to click on the head portion 350 of the currency line 340 and drag currency line 340 to a new location in the task list. When the currency line 340 is released by the pointing device, the tasks above the currency line are all undone, returning the computer program to the state it was in immediately following the execution of the task that is just below the currency line (the last task). Thus, for the specific example of FIG. 10, all of the tasks in the saved marker, namely delete line, add circle, edit text, and nudge text, are all undone, and the color line task is now the last task that was performed.

Figures 11, 12:
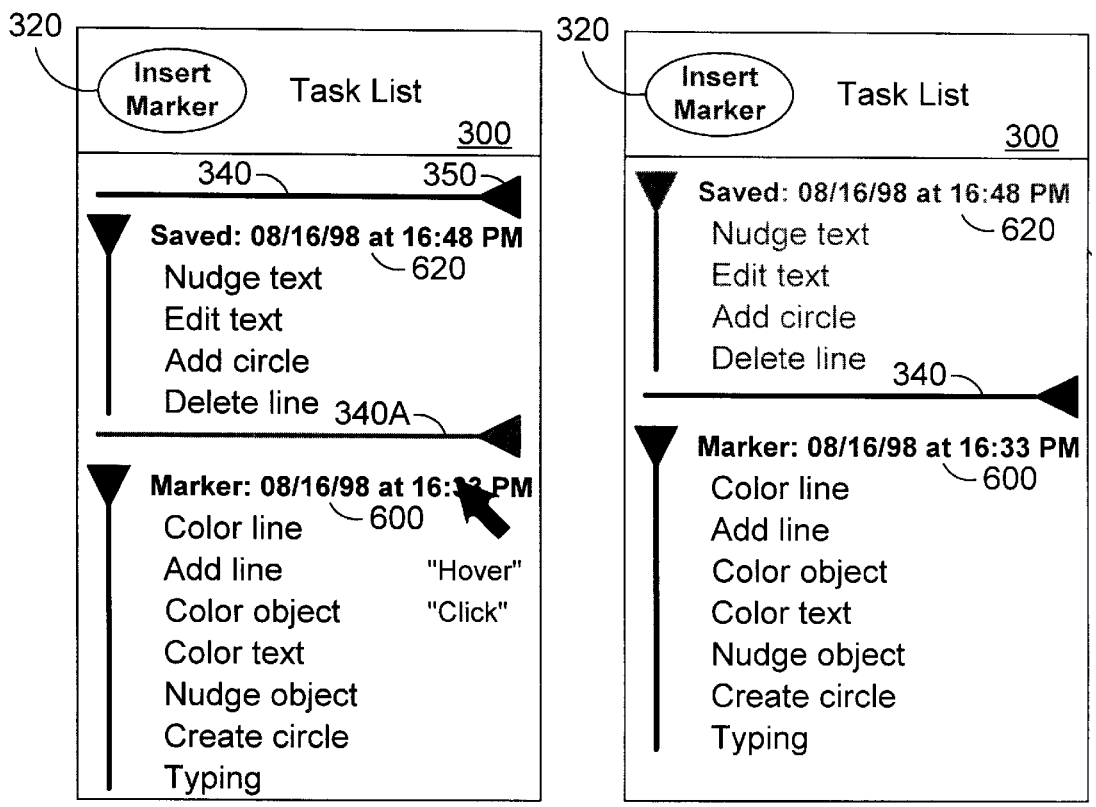
FIG. 11 is a display of the task list of FIG. 10 when the pointing device is hovering atop certain tasks, showing the ghost currency line that indicates which task is selected with the pointing device should the user click the pointing device.
FIG. 12 is a display of the task list of FIG. 11 after the user clicks on the marker identified with the pointing device in FIG. 11.

An alternative way to undo multiple tasks with a single action is to provide a "ghost" currency line whenever the pointer is hovering over the task list, as shown in FIG. 11. Thus, when the pointer is pointing to the marker dated Aug. 16, 1998 at 16:32 PM, a ghost currency line 340A appears above the marker to visually indicate to the user that the tasks above the ghost currency line 340A will be undone if the user clicks on the present location of the pointer. The location of the ghost currency line 340A will change location as the pointer is moved to different tasks on the task list, but the location of the actual currency line 340 remains fixed until the user clicks on a task or drags the currency line 340 to a new location in the task list, both of which together comprise a means for selecting a task on the task list.

We assume that the user clicked on the marker shown in FIG. 11 that is pointed to by the pointing device. This causes the currency line 340 at the top of FIG. 11 to disappear, and the currency line 340 is placed at the location of the ghost currency line 340A when the pointer was clicked. All the tasks above the currency line 340 are then undone, returning the computer program to the state that existed right after executing the color line task. The undo/redo manager thus includes means for undoing previously-executed tasks that come after the selected tasks in time. In the preferred embodiment, the tasks that are undone are visually distinct from the tasks that remain done. This visual distinction may be achieved by using different colors, by providing gray scaling, inverse color boxes, shading, hatching, or any other suitable method for visually distinguishing between the tasks that have been performed and those that have been undone.

In the preferred embodiment, when there are one or more tasks that have been undone on the task list, performing a new task causes the undone tasks to be deleted from the task list and the new task is placed on the task list, as shown in FIG. 13. This scheme is simple and does not require that the computer program keep track of different possible future paths. However, in an alternative embodiment, the task list can be split to represent the tasks that were undone along with the new task that was just performed. For the specific example of FIG. 14, this scheme would allow a user to undo the "add polygon" task, and to then redo one or more of the tasks in the "saved" marker. For example, as shown in FIG. 15, the currency line 340 has been dragged from the position in FIG. 14 to the position in FIG. 15. The result is that the tasks that were previously undone that are now below the currency line 340 are redone, namely "delete line" and "add circle". The "add polygon" instruction is also undone, because it is in a future path that is no longer selected.

Providing the capability of undoing or redoing tasks at defined points gives rise to two new functions that the undo/redo manager 127 may provide, namely: "undo to last marker" and "redo to next marker". These functions allow a user to perform undo and redo operations even if the graphical undo manager 127 is not displayed or present. The "undo to last marker" and "redo to next marker" functions may be provided as menu items, buttons on a toolbar, or any other suitable mechanism for invoking these functions.

Once the undo/redo history for a computer program is compiled in the task list 300, this history may be stored to allow various states of the computer program to be dynamically derived from stored data rather than storing multiple versions of the same file. The history information could be stored separately in the computer system, or the history information could be stored as a part of the file itself, thereby allowing the file to be modified to any of its previous states by simply selecting any suitable marker in the history. This feature saves on storage costs by storing only one version of the file, preferably the most current version, which includes a task history that indicates the changes that have been made to that file over its life.

The preferred embodiments described herein provide an improved user interface by allowing a user to undo and redo multiple tasks in a single operation, without having to move step-by-step through the tasks to be undone or redone. In addition, the preferred embodiments eliminate the need to create multiple versions of a single file to support retrieving the work at a specific point in time, because the undo history can always be used to generate a past version of a document.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. An apparatus comprising:
   at least one processor;
   a memory coupled to the at least one processor; and
   a computer program residing in the memory, the computer program including an undo/redo manager that allows a user to select a first task from a task list that includes a plurality of previously-executed tasks, the selection of the first task causing at least one of the plurality of previously-executed tasks to be undone, wherein the undo/redo manager collapses a plurality of the tasks on the task list into a marker.

2. The apparatus of claim 1 wherein the plurality of tasks are time-ordered in the task list.

3. The apparatus of claim 1 wherein the task list includes at least one subsequently-executed task that was previously undone, the undo/redo manager allowing the user to select a second task from the task list, the second task comprising a subsequently-executed task that was previously undone, the selection of the second task causing at least one of the plurality of subsequently-executed tasks to be redone.

4. The apparatus of claim 1 wherein the marker is defined by a user selecting the plurality of tasks to be collapsed into the marker.

5. The apparatus of claim 1 wherein the marker is defined by a user selecting at least one predetermined command in the computer program that causes the plurality of tasks in the task list to be collapsed into the marker.

6. The apparatus of claim 1 wherein the undo/redo manager defines a currency indicator for showing the state of the plurality of tasks in the task list.

7. The apparatus of claim 6 wherein the state indicates whether each of the plurality of tasks in the task list has been undone.

8. An apparatus comprising:
   at least one processor;
   a memory coupled to the at least one processor;
   a task list residing in the memory, the task list including a plurality of time-ordered tasks that include a plurality of previously-executed tasks; and
   a computer program residing in the memory, the computer program including an undo/redo manager that allows a user to select a first previously-executed task from the task list, the selection of the first task causing at least one of the plurality of previously-executed tasks to be undone, the undo/redo manager including a currency indicator that indicates whether each of the plurality of tasks in the task list has been undone, the undo/redo manager collapsing a plurality of the tasks on the task list into a marker upon explicit selection of the plurality of tasks by the user and upon the execution of a predetermined command in the computer program.

9. The apparatus of claim 8 wherein the task list includes at least one subsequently-executed task that was previously undone, the undo/redo manager allowing the user to select a second task from the task list, the second task comprising a subsequently-executed task that was previously undone, the selection of the second task causing at least one of the plurality of subsequently-executed tasks to be redone.

10. An apparatus comprising:
    a memory;
    a computer program residing in the memory;
    means residing in the memory for generating a time-ordered task list of a plurality of previously-executed tasks including the last task that was executed;
    means for displaying the task list to a user;
    means for selecting a first of the previously-executed tasks;
    means for undoing each of the plurality of previously-executed tasks that are after the first task in time; and
    means for collapsing a plurality of the previously-executed tasks into a marker.

11. A method for undoing a plurality of previously-executed tasks in a computer system, the method comprising the steps of:
    generating a time-ordered task list of the plurality of previously-executed tasks including the last task that was executed;
    displaying the task list to a user;
    receiving a user selection of a first of the previously-executed tasks;
    undoing each of the plurality of previously-executed tasks that are after the first task in time; and
    collapsing a plurality of the tasks on the task list into a marker.

12. The method of claim 11 further comprising the steps of:
    receiving a user selection of a subsequent task that was previously undone from the plurality of tasks on the task list;
    redoing each of the plurality of tasks between the last task and the selected task; and
    redoing the selected task.

13. The method of claim 11 wherein the marker is defined by a user selecting the plurality of tasks to be collapsed into the marker.

14. The method of claim 11 wherein the marker is defined by a user selecting a predetermined command in the computer program that automatically collapses the plurality of tasks in the task list into the marker.

15. A computer readable program product comprising:
    a computer program that includes an undo/redo manager that allows a user to select a first task from a task list that includes a plurality of previously-executed tasks, the selection of the first task causing at least one of the plurality of previously-executed tasks to be undone, wherein the undo/redo manager collapses a plurality of the tasks on the task list into a marker; and
    signal bearing media bearing the computer program.

16. The program product of claim 15 wherein the signal bearing media comprises recordable media.

17. The program product of claim 15 wherein the signal bearing media comprises transmission media.

18. The program product of claim 15 wherein the plurality of tasks are time-ordered in the task list.

19. The program product of claim 15 wherein the task list includes at least one subsequently-executed task that was previously undone, the undo/redo manager allowing the user to select a second task from the task list, the second task comprising a subsequently-executed task that was previously undone, the selection of the second task causing at least one of the plurality of subsequently-executed tasks to be redone.

20. The program product of claim 15 wherein the marker is defined by a user selecting the plurality of tasks to be collapsed into the marker.

21. The program product of claim 15 wherein the marker is defined by a user selecting a predetermined command in the computer program that causes the plurality of tasks in the task list to be collapsed into the marker.

22. The program product of claim 15 wherein the undo/redo manager defines a currency indicator for showing the state of the plurality of tasks in the task list.

23. The program product of claim 22 wherein the state indicates whether each of the plurality of tasks in the task list has been undone.

24. A computer readable program product comprising:
   (A) a computer program including:
      a task list of time-ordered tasks that include a plurality of previously-executed tasks; and
      an undo/redo manager that allows a user to select a first previously-executed task from the task list, the selection of the first task causing at least one of the plurality of previously-executed tasks to be undone, the undo/redo manager including a currency indicator that indicates whether each of the plurality of tasks in the task list has been undone, the undo/redo manager collapsing a plurality of the tasks on the task list into a marker upon explicit selection of the plurality of tasks by the user and upon the execution of at least one predetermined command in the computer program; and
   (B) signal bearing media bearing the computer program.

25. The program product of claim 24 wherein the signal bearing media comprises recordable media.

26. The program product of claim 24 wherein the signal bearing media comprises transmission media.

27. The program product of claim 24 wherein the task list includes at least one subsequently-executed task that was previously undone, the undo/redo manager allowing the user to select a second task from the task list, the second task comprising a subsequently-executed task that was previously undone, the selection of the second task causing at least one of the plurality of subsequently-executed tasks to be redone.

* * * * *